O. E. MICHAUD.
ROLLER BEARING.
APPLICATION FILED OCT. 26, 1916.
1,269,834. Patented June 18, 1918.
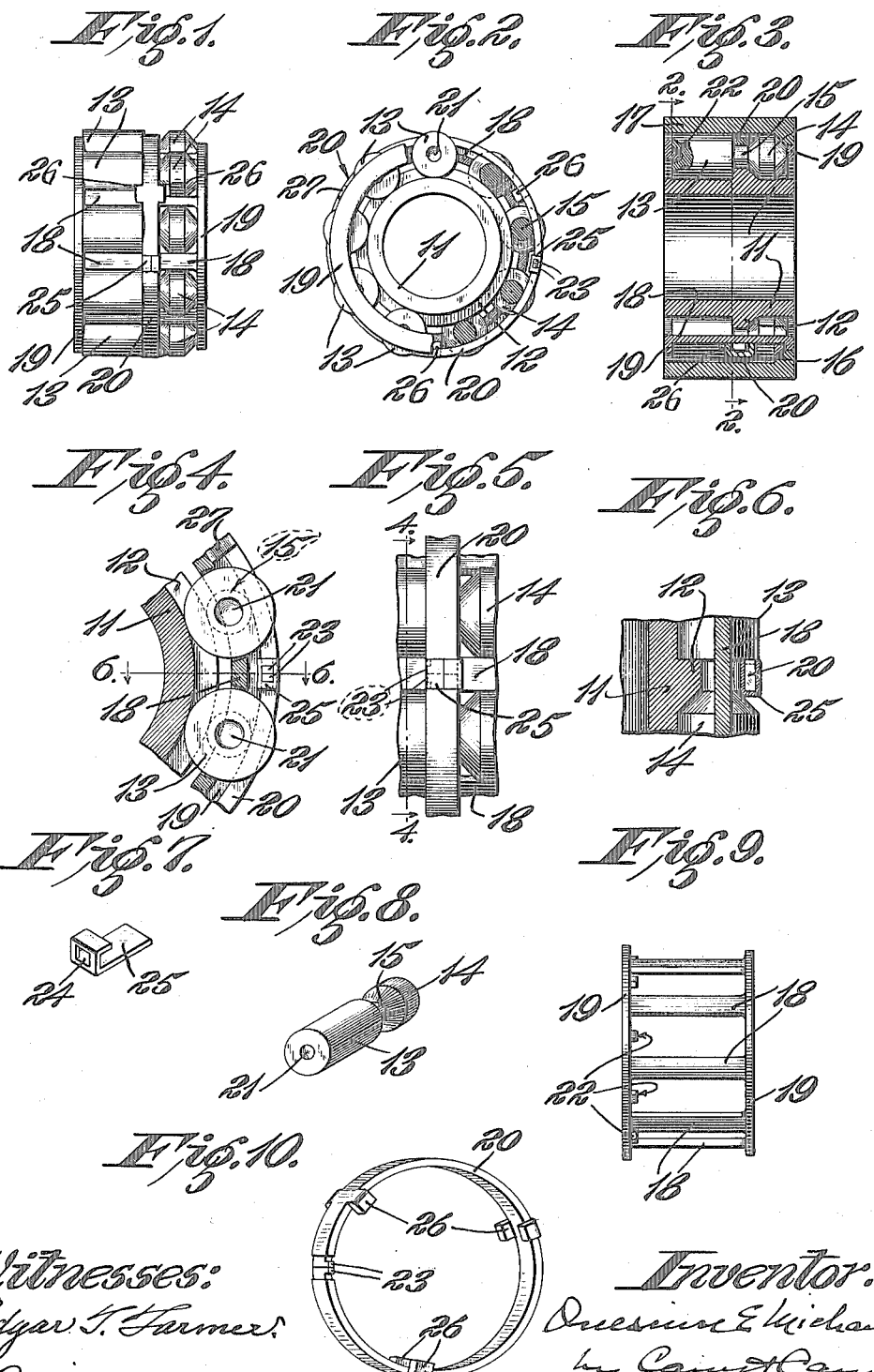

UNITED STATES PATENT OFFICE.

ONESIME E. MICHAUD, OF ST. LOUIS, MISSOURI, ASSIGNOR OF ONE-HALF TO FRITZ A. MULLER, OF McGEHEE, ARKANSAS.

ROLLER-BEARING.

1,269,834.        Specification of Letters Patent.        Patented June 18, 1918.

Application filed October 26, 1916.   Serial No. 127,796.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to antifriction bearings of the type wherein a series of cylindrical or conical rollers are spaced circumferentially between inner and outer concentric bearing races or rings. The invention relates to the shape and arrangement of the parts of the bearing, and particularly to an improved spacing and retaining device for bearing rollers having necks of reduced diameter between their ends, for holding them in circular alinement at fixed distances apart around the inner bearing rings.

The objects of the invention are to reduce the space required for the bearing, to maintain the bearing rollers in alinement without cramping or binding them, and to simplify the construction and cheapen the cost of the bearing. Further objects of the invention relate to improvements in the materials and in the construction of antifriction bearings and retaining devices therefor, said improvements being more fully pointed out hereinafter.

Generally stated, the invention consists in the combination of a series of cylindrical or conical rollers which are circumferentially grooved or necked to form a head at one end of each, and arranged around a roller race-way or bearing ring having a flange around it which fits in the grooves under the necks of the rollers, with a spacing member or cage for maintaining the rollers in parallel alinement and equi-distantly spaced around the bearing ring, and a retaining band surrounding the rollers and lying in the grooves over their necks for holding the rollers and the cage in assembled position. The invention also consists in the shape and construction of the cage, and in the means for holding the ends of the retaining band together.

The invention further consists in the parts, and in the arrangements and combinations of parts, hereinafter described and claimed.

The accompanying drawings illustrate a preferred form of the invention, embodying straight rollers, but it is to be understood that the invention is also applicable to bearings having tapered rollers.

In the drawings, wherein the same reference characters designate the same parts in the several views, Figure 1 is a side elevation of a spacing cage and retaining band assembled with rollers around an inner bearing ring;

Fig. 2 is a part end view and part cross-section on the line 2—2 in Fig. 3 of inner bearing ring, rollers, cage and retaining band, showing them removed from the outer bearing ring;

Fig. 3 is a longitudinal cross-section through the axis of the bearing and outer bearing ring.

Fig. 4 is an enlarged view of the ends of the rollers and side elevation of the ends of the retaining ring, showing the inner bearing ring and the spacing member in cross-section on the line 4—4 in Fig. 5;

Fig. 5 is a side elevation to the same scale as Fig. 4 of portions of two rollers and the ends of the retaining ring, showing the locking means for holding the ends of the retaining ring together;

Fig. 6 is a longitudinal section of the same on the line 6—6 in Fig. 4;

Fig. 7 is a perspective view of the locking member for the retaining ring;

Fig. 8 is a perspective view of a roller;

Fig. 9 is a side elevation of the spacing cage; and

Fig. 10 is a perspective view of the retaining ring.

Referring to the accompanying drawings, the inner bearing ring 11 of the roller bearing has an exterior circumferential rib or flange 12, one edge of which is beveled. The bearing rollers 13 are cylindrical, and each comprises a main bearing portion and a head 14 connected by a neck 15 of reduced diameter. The inner circumferential edge of the head 14 of each bearing roller is beveled to coöperate with the beveled edge of the flange 12 of the inner bearing ring 11. The outer circumferential edge of the head 14 of each bearing roller is also beveled to coöperate with a beveled face or flange 16 of an outer bearing ring 17.

The spacing member or roller cage 18 (see Fig. 9) is made of a wide endless band or ring of sheet metal, which has a series of parallel slots punched in it shaped to embrace the rollers. The ends of the spacing member are turned out to form flanges 19 which cross the ends of the rollers. A retaining band 20 encircles the necks of the rollers and holds them in position in the slots of the spacing cage. The retaining ring lies in the grooves between the rollers and the outer bearing ring, and is held in alinement thereby.

The ends of the rollers opposite their heads have conical depressions 21 in them at their centers, and projections 22 from the adjacent end flange 19 of the spacing member fit into these conical depressions and hold the spacing member in circumferential alinement with the ends of the rollers. The band of the retaining member encircles the bearing rollers and positively prevents them from moving outwardly from the inner bearing ring, and the cylindrical portions and the heads 14 of the bearing rollers 13 straddle the flange 12 of the inner bearing ring 11 and prevent the rollers from slipping endwise. The band and intermediate portions of the spacing members encircle closely the necks 15 of the bearing rollers, and the retaining member is thereby held against movement lengthwise of the rollers. The outer bearing ring 17 can be slipped into place endwise over the rollers until the beveled inner face of the flange 16 brings up against the outer beveled edges of the heads 14.

The ends of the retaining ring are notched on one side to form tenons 23, which fit into a hole 24 in the sheet metal clip 25 which is bent around the ends of the ring to hold them together. The top, the bottom, and the side of the ring opposite the tenons are recessed to form a shallow groove around the ring for the clip 25 to lie in.

The sides of the retaining ring are provided with inwardly projecting lugs 26 (see Fig. 10) for positioning the ring and spacing cage in circumferential alinement; or separate spacers having notches in their outer edges may be slipped between the ring and spacing cage for holding them concentric.

The spacing member can be made from a single piece of sheet metal by simple punching and bending operations with sufficient accuracy for most purposes. A very high degree of accuracy of the guiding faces can be attained by reaming them after the punching and bending operations.

The construction shown and hereinbefore described may be considerably changed without departing from the invention and I do not wish to be restricted to the details of the construction shown and described.

I claim the following as my invention:

1. A roller bearing comprising an inner bearing ring, grooved rollers arranged around said ring with their grooves in circumferential alinement, a retaining ring lying in said grooves and surrounding said rollers, and a cage having separators between said rollers, said retaining ring surrounding said separators for holding said cage concentric with said inner bearing ring.

2. A roller bearing comprising an inner bearing ring, grooved rollers arranged around said ring with their grooves in circumferential alinement, a retaining ring lying in said grooves and surrounding said rollers, said retaining ring having projecting portions at its ends, and a cage having separators between said rollers, said retaining ring surrounding said separators for holding said cage concentric with said inner bearing ring, and spaced walls in alinement with one of said separators into which the projecting portions of said ring fit to fasten said ring in place.

3. A roller bearing comprising an inner bearing ring, grooved rollers arranged around said ring with their grooves in circumferential alinement, a retaining ring lying in said grooves and surrounding said rollers, and a cage having separators between said rollers, with outwardly projecting portions between said grooves, said retaining ring embracing the outwardly projecting portions of said separators for holding said cage concentric with said inner bearing ring.

4. A retaining ring for bearings comprising grooved rollers, said retaining ring being adapted to lie in the grooves of the rollers, and having tenons projecting transversely at its ends, and a clip for securing the ends of said ring together, said clip having a recess adapted to embrace said tenons, and a flexible end adapted to be bent around said retaining ring to hold it in securing position.

5. A retaining ring for bearings comprising grooved rollers, said retaining ring being adapted to lie in the grooves of the rollers, and having tenons projecting transversely at its ends, and a clip for securing the ends of said ring together, said clip consisting of a strip of sheet metal having a hole through it adapted to embrace said tenons, the ends of said strip being adapted to be bent around said retaining ring to hold it in securing position.

6. A roller bearing comprising a bearing ring and a series of rollers having grooves, a spacing member having pockets for said rollers, and a retaining ring lying in the grooves of said rollers, said retaining ring and spacing member being concentric, and means in the spaces between said ring and spacing member for maintaining them concentric, said means consisting of wings on one of said members bent to engage the other member.

7. A roller bearing comprising a spacing cage having a series of pockets, rollers mounted in said pockets, said rollers being grooved at one end to form heads, and the opposite ends of said rollers being recessed to receive centers, and projections from the ends of said pockets to engage said recessed rollers.

8. A roller bearing comprising a spacing cage having a series of pockets, rollers mounted in said pockets, said rollers being grooved at one end to form heads, and the opposite ends of said rollers being recessed to receive centers, and projections from the ends of said pockets to engage said recessed rollers, and a ring lying in the grooves of said rollers to retain the rollers in the grooves, said ring being attachable and detachable to permit the rollers to be inserted in said pockets with their recessed ends pivoted on said projections.

9. A retaining ring for bearings comprising grooved rollers, and a spacing cage, said retaining ring being adapted to lie in the grooves of the rollers, and having spaced marginal portions adapted to position said ring concentrically within it.

Signed at St. Louis, Missouri, this 23rd day of October, 1916.

ONESIME E. MICHAUD.